UNITED STATES PATENT OFFICE.

CLIFFORD S. REDFIELD, OF BROOKLINE, MASSACHUSETTS, ASSIGNOR TO ESSEX RUBBER COMPANY, INC., OF TRENTON, NEW JERSEY, A CORPORATION OF NEW JERSEY.

RUBBER SOLE FOR BOOTS AND SHOES.

1,103,892.

Specification of Letters Patent. Patented July 14, 1914.

Application filed April 24, 1914. Serial No. 834,241.

No Drawing.

*To all whom it may concern:*

Be it known that I, CLIFFORD S. REDFIELD, a citizen of the United States, and a resident of Brookline, in the county of Norfolk and State of Massachusetts, have invented an Improvement in Rubber Soles for Boots and Shoes, of which the following description is a specification.

This invention relates to rubber soles for boots and shoes and particularly for leather, canvas or artificial leather shoes.

In order that the invention may be readily understood, I shall describe the preferred embodiment thereof.

The rubber sole constituting and embodying my invention is preferably composed of raw or unused rubber, mineral matter and previously used or reclaimed matter containing rubber. These ingredients may be incorporated in varying proportions according to the particular requirements of manufacture. I have found that for certain requirements I may introduce the ingredients in substantially the following proportions, which, however, may be widely varied within the scope of my invention: Raw rubber 1 lb., previously used or reclaimed rubber containing material 4 to 6 lbs., mineral matter 2 lbs. The raw rubber, suitably washed and dried, is ground up in a suitable mill until it is in a very soft condition, care being taken that the rubber does not become hot enough to burn. If no previously used rubber-containing material is to be added, the mineral matter is now added and milled with the raw rubber until there is formed a homogeneous mixture. If, however, previously used rubber material is to be incorporated, such latter material is ground in a suitable mill until it is in a fairly soft condition. Thereafter the raw rubber is ground until it is in a soft condition, the two ingredients being then mixed together and finally the mineral matter is added. The amount of mineral matter added must not be such as to render the sheets or blanks too "dry", as in such case blistering will ensue in the building up or superposing thereof. I preferably add a small quantity of palm oil or cotton seed oil so as to render the material very slightly adhesive, but not sufficiently so that the sheets will adhere unintentionally or by the application of but light pressure.

I may and preferably do color the ingredients in any known or suitable manner, as, for example, by adding lamp black to obtain a black sole, by adding red oxid of iron or sulfid of antimony to obtain a red sole, and by adding suitable coloring matter to obtain a white sole.

In vulcanizing the material, I preferably employ sulfur, reducing the so-called "sulfuring" of the material to as great an extent as possible, by causing the free sulfur to be wholly or very largely taken up during vulcanization.

By employing previously used rubber containing material, I obtain a compound having a much lower specific gravity, thus rendering it unnecessary to add as much mineral matter as would otherwise be required. Such rubber containing material may be of any suitable nature. If rubber tire material is used in the manufacture of a rubber sole to be vulcanized in live steam, the sole is greatly toughened and wears longer than the corresponding grade of a molded sole not containing such rubber tire material. I so mix the materials that ultimately what I term the fiber of the material or fibrous condition thereof extends longitudinally of the sheet in a substantially parallel condition, and hence transversely of the sole which is cut therefrom, thereby rendering said sole of greater strength transversely than longitudinally. I cause the ingredients to become thoroughly assimilated, this being preferably effected by permitting the stock or material to remain in a quiescent condition for a period of time, preferably at least twenty-four hours. I then grind the stock until it is in a soft condition, and thereupon take a mass or lump thereof and run it through a calendering machine or other equivalent or like apparatus, from which it issues in sheet-like form. Preferably the rolls of the calendering machine or certain of them, are so cut as to produce a sheet of irregular cross section; that is, the calender rolls are preferably so shaped that the sheet is thinner at the points corresponding to the portion of the sole between the heel and ball of the foot, and if no heel is to be formed, then the portion of the sheet corresponding to the ball of the foot is made thicker than the remaining portion of the sheet.

As previously stated, I pass a mass of the mixed ingredients through the calendering machine, the rolls of which cause it to issue therefrom in sheet form. The mass prior to its passage through the calendering rolls has no fibrous structure and is of uniform strength. The sheet as it issues from the calendering machine has what I term a fibrous texture or condition. These so-called fibers extend longitudinally of the sheet, and hence transversely of the ultimate sole. The so-called fibers are substantially parallel and impart a greater strength to the sheet longitudinally than transversely, thereby rendering the sole of greater strength transversely than longitudinally inasmuch as the sole is cut transversely of the sheet. The extent of this fibrous condition is indicated not only by the greater longitudinal strength of the sheet, but also by the fact that the sheet will crack more readily longitudinally than it will transversely, that is, between the so-called "fibers." Furthermore, the sheet is of greater flexibility in a transverse direction; that is, in a direction which is transverse to the so-called fibrous condition. Therefore, the sole is characterized by so-called fibers extending in a parallel condition transversely thereof, thus rendering the sole stronger transversely than it is longitudinally, and is also characterized by greater flexibility longitudinally than transversely.

An important object of my invention is to preserve the surface and the internal structure or character of the rubber-containing sheet issuing from the calendering machine, and which has certain known characteristics, among which I may enumerate the natural, somewhat pitted surface, rendering it somewhat rough and giving it an adhesive retaining quality, which a polished surface or one characteristic of a sole vulcanized in a mold does not possess. The sheet issuing from the calendering machine possesses a surface which is peculiarly adapted for the reception of cement, and by reason of it the sole may be more tightly and permanently secured to the shoe. The somewhat rough or pitted condition of this surface is such that the rubber in solution in the cement is carried by the gasolene or other solvent into the pits or inequalities of the surface, and remains after evaporation of the solvent, thus resulting in a more permanent union of the sole and the shoe.

In accordance with an important feature of my invention, I provide a sole, the surface of which possesses the characteristics of the sheet issuing from the calendering machine; that is, a sole having a natural surface with pits or inequalities which will receive the cement as stated. Heretofore so far as I am aware, when vulcanized apart from the shoe, rubber soles have invariably been vulcanized in a mold, the members of which contact with the surface, and impart to the sole unnatural or polished surfaces substantially devoid of pits or irregularities and therefore not well adapted for the adherence thereto of cement. In order to preserve the surface characteristic of the sheet as it issues from the calendering machine, I vulcanize the sheet in a free and unrestrained and unattached condition. I thus preserve the calendered structure possessed by the sheet.

When a rubber sole is vulcanized in a mold, the vulcanization is due to the contact of the heated plates with the surfaces of the sole and this not only imparts a polished, unnatural and unpitted condition to the surface, but this condition extends throughout the entire substance of the sole inasmuch as the sole is retained in the mold until the heat extends through the sole sufficiently to vulcanize it throughout. The surface is overheated and becomes hard and crust-like. When, however, the sole is vulcanized in a free and unrestrained condition and steam is permitted to contact with and act directly upon the sole, it is heated more slowly, but the outer surface is not more highly heated than the interior, and not only is the surface of the sole permitted to remain in a natural, pitted or slightly roughened condition, but these so-called pitted characteristics extend throughout the entire substance of the sole which therefore is of a homogeneous character throughout. The action of the steam is to impart greater toughness and more life to the sole, a characteristic not possessed by a sole vulcanized in a mold.

The ingredients are so mixed and so passed through the calender rolls that when the sheet issuing therefrom is permitted to remain in a quiescent condition, a shrinkage occurs, which is wholly longitudinally of the sheet. This is mainly due to the fact that the fibrous condition of the sheet is wholly longitudinally thereof. Inasmuch as the soles are cut transversely of the sheet, the fibrous condition thereof is wholly transversely of the sole, and the longitudinal shrinkage of the sheet characterizes the sole as one which is transversely shrunk. This shrinkage occurs while the sheet is supported flatwise upon a suitable surface, and during such shrinkage there is an increase in the thickness of the material. Therefore from a determined shape of calender rolls, I obtain a sole of the desired thickness at all points.

To obtain the necessary longitudinal shrinkage of the sheet, I permit the latter to remain in a free condition for a considerable period of time, preferably at least twenty-four hours. I then cut the soles from the sheet in a direction transverse of the stock as the latter issues from the calendering machine. I thereby obtain a sole in which the fibrous condition or structure thereof extends transversely thereof. Inasmuch as I permit longitudinal shrinkage of the sheet to terminate before I cut the soles therefrom, no lateral or transverse shrinkage of the cut sole results. I therefore obtain a cut sole, the lateral edges of which have shrunk to the proper dimension. I, however, cut each sole slightly longer than the ultimate length, inasmuch as subsequent longitudinal shrinkage of the cut sole occurs to a slight extent and sufficiently to leave the ultimate sole of precisely the proper length. The rubber sole of my invention is therefore characterized by an encircling rim or edge the end or toe and heel portions of which are shrunk to the proper dimension and form.

Heretofore so far as I am aware, a sole for a rubber shoe has never been vulcanized in a wholly free or unrestrained or unattached condition, but when the rubber sole has been vulcanized apart from the shoe, it has been placed in a vulcanizing mold closely fitting it. I vulcanize the sole in an unattached and free or unrestrained condition, and thereby obtain an article having an inherent structure and qualities derived from its vulcanization in such unattached or unrestrained condition as heretofore pointed out.

Preferably I carry on the vulcanization in the presence of live steam, as the unrestrained or free sole is livened up by the action thereof. The live steam acting on the oxid of zinc forms sulfid of zinc, which imparts toughness, life and wearing qualities to the sole.

Because of the vulcanization of the sole in a free and unrestrained condition, the particles of the material constituting the sole, being unrestrained, do acutally, during vulcanization, flow or move about and accommodate themselves to each other in such a manner as to result in giving more life to the product and to render it more flexible and tougher and more enduring. The sole therefore has a surface, the particles of which are self-distributed and the particles of the sole are distributed in accordance with the normal or substantially free or unrestrained flow thereof. This not only preserves the natural, pitted or "calendered" surface of the sole, but obtains such a distribution of particles throughout the sole as to secure increased toughness and life.

In order to obtain the characteristic structure of the sole, I effect the vulcanization thereof in a suitable chamber or container, wherein they are supported in a loose or free condition horizontally upon boards or plates, the latter being preferably supported upon transverse wires or other supporting means distributed throughout the chamber.

The vulcanization is effected either through the use of live steam or air under pressure, but preferably the former. I introduce the live steam preferably through a perforated pipe extending along the floor or bottom of the chamber and discharging upwardly toward the horizontal supports whereon the boards or plates are horizontally positioned. During vulcanization the soles shrink longitudinally but not transversely, this result being due partially to the fact that the soles are positioned in the chamber with their longest dimension in the direction of the longest dimension of the chamber.

I may vulcanize the soles under air pressure, the air being preferably heated, and if the vulcanization be carried on in the presence of live steam, air under a pressure of several atmospheres is preferably first introduced. I thus obtain a preliminary partial solidification of the material, but not enough to prevent the interexchange of position or movement of the particles of each sole, which movement also occurs during the time the soles are subjected to the preliminary action of compressed air.

The sole, when placed in the vulcanizing oven or chamber, is in a thoroughly plastic condition, and during vulcanization the temperature of the oven is usually considerably in excess of 200° F. The vulcanization is carried on for a suitable length of time which must, however, be sufficient to permit and to obtain the flowing or rearrangement of the material hereinbefore set forth, and by reason of which the life, character and toughness of the material are enhanced and the superficial character and internal structure thereof are altered.

It will be evident from the foregoing that I obtain a rubber sole for boots and shoes having certain characteristics hereinbefore set forth and by which said sole is distinguished.

Having thus described one illustrative embodiment of my invention, I desire it to be understood that although specific terms are employed, they are used in a generic and descriptive sense and not for purposes of limitation, the scope of the invention being set forth in the following claims:

Claims.

1. An unattached, vulcanized, rubber sole for boots and shoes comprising rubber-containing material having a natural, "calendered" surface.

2. An unattached, vulcanized rubber sole for boots and shoes consisting of rubber-containing material having a wholly transverse, "fibrous" structure rendering said sole of greater transverse than longitudinal strength.

3. An unattached, vulcanized rubber sole for boots and shoes comprising rubber-containing material having greater transverse than longitudinal strength and greater longitudinal than transverse flexibility, and having a natural, " calendered " surface.

4. An unattached, vulcanized rubber sole for boots and shoes comprising rubber-containing material having a natural, " calendered," pitted surface and being of substantially homogeneous structure throughout.

5. An unattached, vulcanized rubber sole for boots and shoes comprising rubber-containing material having a natural, " calendered," pitted surface and being of substantially homogeneous structure throughout.

6. An unattached, vulcanized rubber sole for boots and shoes comprising rubber-containing material having its constituent surface and internal particles self-distributed, and having its end portions shrunken.

7. An unattached, vulcanized rubber sole for boots and shoes comprising rubber-containing material having its constituent surface and internal particles self-distributed, said sole having its thickness increased by expansion of the material.

8. An unattached, vulcanized, rubber sole for boots and shoes comprising rubber-containing material having a natural, preserved, " calendered " surface, and being of greatest strength in a transverse direction and of greatest flexibility in a longitudinal direction, said sole being of substantially homogeneous structure throughout.

In testimony whereof, I have signed my name to this specification in the presence of two subscribing witnesses.

CLIFFORD S. REDFIELD.

Witnesses:
IRVING U. TOWNSEND,
MAY H. LOWRY.